United States Patent
Laska et al.

(10) Patent No.: US 9,721,581 B2
(45) Date of Patent: Aug. 1, 2017

(54) METHOD AND DEVICE FOR MITIGATING WIND NOISE IN A SPEECH SIGNAL GENERATED AT A MICROPHONE OF THE DEVICE

(71) Applicant: BlackBerry Limited, Waterloo (CA)

(72) Inventors: Brady Nicholas Laska, Ottawa (CA); James David Gordy, Ottawa (CA); Michael Tetelbaum, Ottawa (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 14/834,512

(22) Filed: Aug. 25, 2015

(65) Prior Publication Data
US 2017/0061979 A1   Mar. 2, 2017

(51) Int. Cl.
*H04R 1/08* (2006.01)
*G10L 21/0208* (2013.01)
(Continued)

(52) U.S. Cl.
CPC ............ *G10L 21/0208* (2013.01); *H04R 1/08* (2013.01); *G10L 21/0232* (2013.01);
(Continued)

(58) Field of Classification Search
CPC ..... G10L 21/0208; G10L 25/78; G10L 15/20; G10L 2021/02165; G10L 2021/02166;
(Continued)

(56) References Cited

U.S. PATENT DOCUMENTS 6,937,980 B2 * 8/2005 Krasny .................. G10L 15/20
                                                                 704/231
7,346,179 B1 * 3/2008 Bobisuthi .............. H04R 1/086
                                                                 381/174
(Continued)

FOREIGN PATENT DOCUMENTS

AU   WO 2015179914 A1 * 12/2015   ............. H04R 3/005
CN        102209135 A      5/2011
WO     2012/159380 A1     11/2012

OTHER PUBLICATIONS

Thomas Thom—Background noise reduction: one of your smartphone's greatest tools; Feb. 28, 2014, Downloaded from http://www.techradar.com/news/phone-and-communications/mobile-phones/background-noise-reduction-one-of-your-smartphones-greatest-tools-1228924.

(Continued)

*Primary Examiner* — Vijay B Chawan
(74) *Attorney, Agent, or Firm* — Perry + Currier Inc.

(57) ABSTRACT

A mobile communication device and a method of mitigating wind noise in a speech signal generated at a microphone of the mobile communication device. A primary microphone of the mobile communication device receives speech and wind noise and generates a first speech signal based on the speech and the wind noise that is received. A secondary microphone of the mobile communication device receives attenuated speech and generates a second speech signal based on the attenuated speech that is received. The secondary microphone is shielded from the wind noise when the primary microphone receives speech and the wind noise. A processor of the mobile communication device processes the first speech signal to replace a low frequency portion of the first speech signal with the second speech signal in order to mitigate the wind noise in the first speech signal.

20 Claims, 6 Drawing Sheets

(51) Int. Cl.
  *H04M 1/19*      (2006.01)
  *H04R 3/00*      (2006.01)
  *G10L 21/0216*   (2013.01)
  *G10L 21/0232*   (2013.01)

(52) U.S. Cl.
  CPC ..... *G10L 2021/02165* (2013.01); *H04M 1/19* (2013.01); *H04R 3/005* (2013.01); *H04R 2225/43* (2013.01); *H04R 2410/07* (2013.01)

(58) Field of Classification Search
  CPC ..... G10L 2021/02168; G10L 2025/783; G10L 2025/937; G10L 21/0232; G10L 21/0272; G10L 25/24; G10L 25/27; H04R 2410/07; H04R 25/505; H04R 1/086; H04R 2201/107; H04R 2201/403; H04R 2420/07; H04R 2430/03; H04R 2430/20; H04R 2499/13; H04R 25/453; H04R 25/502; H04R 27/00; H04R 3/005; H04R 3/02
  USPC ....... 704/226, 233, 228, 210, 215, 220, 225, 704/231, 270; 381/174, 317, 320, 321, 381/355, 71.1, 82, 94.1, 94.2
  See application file for complete search history.

(56) References Cited

U.S. PATENT DOCUMENTS

| | | | | |
|---|---|---|---|---|
| 7,464,029 | B2* | 12/2008 | Visser | G10L 21/0272 704/210 |
| 7,627,132 | B2* | 12/2009 | Anderson | H04R 1/086 381/356 |
| 8,019,103 | B2* | 9/2011 | Kates | H04R 25/502 381/317 |
| 8,180,067 | B2* | 5/2012 | Soulodre | H04M 9/082 381/92 |
| 8,352,274 | B2* | 1/2013 | Yoshizawa | G10L 21/0208 704/270 |
| 8,374,855 | B2* | 2/2013 | Hetherington | G10L 21/0208 704/226 |
| 8,428,275 | B2* | 4/2013 | Yoshida | H04R 3/04 381/94.1 |
| 8,554,556 | B2* | 10/2013 | Yu | G10L 25/78 704/233 |
| 8,600,072 | B2* | 12/2013 | Park | H04R 3/007 381/94.1 |
| 8,892,431 | B2* | 11/2014 | Gerkmann | G10L 21/0208 704/226 |
| 8,914,282 | B2* | 12/2014 | Konchitsky | G10L 21/0208 704/220 |
| 2005/0036629 | A1* | 2/2005 | Aubauer | H04R 3/02 381/71.1 |
| 2008/0226098 | A1 | 9/2008 | Haulick et al. | |
| 2012/0121100 | A1 | 5/2012 | Zhang et al. | |
| 2012/0207315 | A1 | 8/2012 | Kimura et al. | |
| 2012/0310639 | A1* | 12/2012 | Konchitsky | G10L 21/0208 704/226 |

OTHER PUBLICATIONS

Extended European Search Report dated Jan. 23. 2017 for European Patent Application No. 16184810.6.
Katja Freels et al.: "New Wireless, Binaural Processing Reduces Problems Associated with Wind Noise in Hearing Aids" Oct. 12, 2015.

* cited by examiner

METHOD AND DEVICE FOR MITIGATING WIND NOISE IN A SPEECH SIGNAL GENERATED AT A MICROPHONE OF THE DEVICE

FIELD

The present disclosure relates generally to mobile communication devices and specifically to a method of mitigating wind noise in a speech signal generated at a microphone of the mobile communication device.

BACKGROUND

In mobile communication devices, when audible information, such as speech of a user, is received at a microphone of a mobile communication device, a signal representative of the received speech is generated at the microphone for further processing at the device. Wind in the surrounding environment of the device generates turbulent airflow around the microphone of the device, which causes the transducer membrane of the microphone to move while speech is received at the microphone, resulting in wind noise being received at the microphone of the device while speech is received. The movement of the transducer of the microphone due to turbulent airflow causes the microphone to generate a signal representative of the received speech that is corrupted by wind noise. Known digital signal processing methods may be used to reduce the perceptual annoyance of wind noise in the signal representative of the received speech. Unfortunately, known digital signal processing methods also remove desired speech from the signal, resulting in a signal that does not accurately represent the speech received at the microphone.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
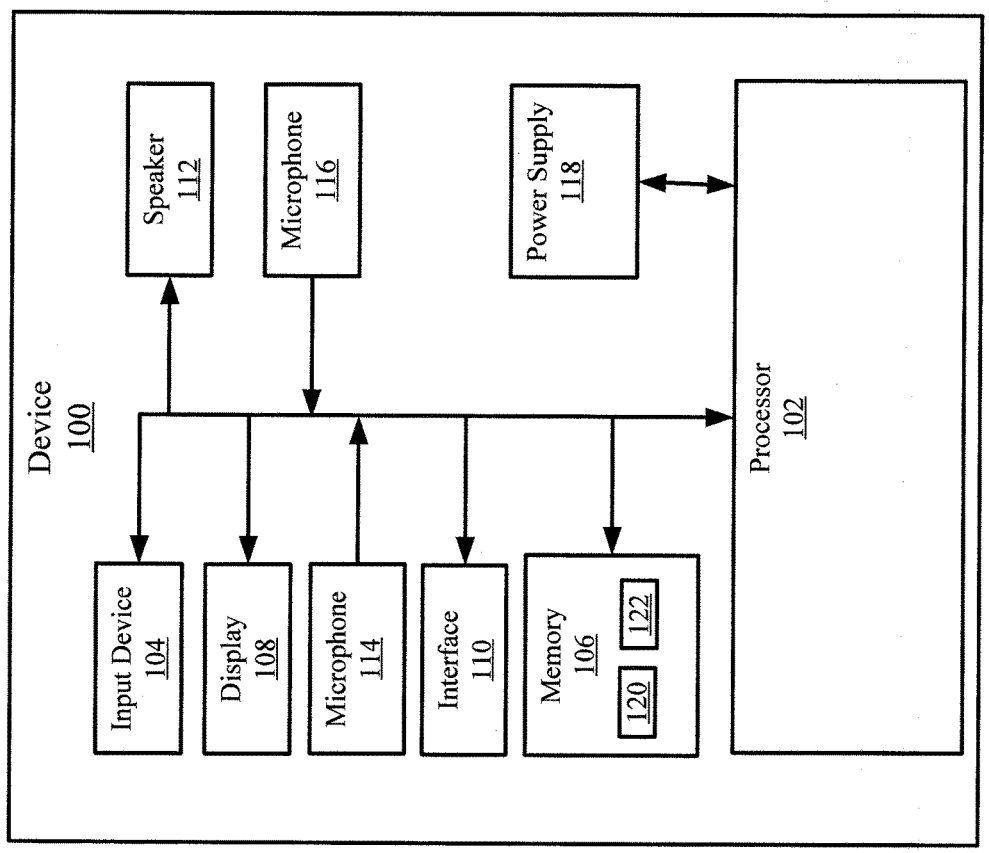
FIG. 1 is a block diagram of the mobile communication device in accordance with the disclosure.

The following describes a mobile communication device and a method of mitigating wind noise in a speech signal generated at a primary microphone of the mobile communication device. The primary microphone of the mobile communication device receives speech and wind noise and generates a first speech signal based on the speech and the wind noise that is received. A secondary microphone of the mobile communication device receives attenuated speech and generates a second speech signal based on the attenuated speech that is received. The secondary microphone is shielded from the wind noise when the primary microphone receives speech and the wind noise. A processor of the mobile communication device processes the first speech signal to replace a low frequency portion of the first speech signal with the second speech signal in order to mitigate the wind noise in the first speech signal.

In the present disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

In the present disclosure, reference is made to a microphone generating a speech signal. In general, it is appreciated that such speech signal can be converted to speech data, and hence the feature of a microphone generating a speech signal can be interchangeably replaced with the term a microphone generating a speech data. The speech data may be stored in a memory of the mobile communication device and may be processed by a processor of the mobile communication device.

An aspect of the present disclosure provides a mobile communication device comprising: a primary microphone configured to receive speech and wind noise and generate a first speech signal based on the speech and the wind noise that is received; a secondary microphone configured to receive attenuated speech and generate a second speech signal based on the attenuated speech that is received, wherein the secondary microphone is shielded from the wind noise when the primary microphone receives the speech and the wind noise; and, a processor operably coupled to the primary microphone and the secondary microphone, the processor configured to: process the first speech signal to replace a low frequency portion of the first speech signal with a low frequency portion the second speech signal to mitigate the wind noise in the first speech signal.

The processor may be further configured to replace the low frequency portion of the first speech signal with the low frequency portion of the second speech signal by: filtering the low frequency portion of the second speech signal to generate an equalized signal; aligning, in time, the equalized signal with the low frequency portion of the first speech signal to generate a time-aligned equalized signal; and, mixing a high frequency portion of the first speech signal with the time-aligned equalized signal.

Mixing may include mixing the high frequency portion of the first speech signal with the time-aligned equalized signal in a time domain.

Mixing may include mixing the high frequency portion of the first speech signal with the time-aligned equalized signal in a frequency domain.

The processor may be further configured to: determine a frequency span of the wind noise received at the primary microphone; and, determine a frequency range of the low frequency portion of the first speech signal to be replaced based on the determined frequency span of the wind.

The frequency range of the low frequency portion of the first speech signal may be 0 kHz to 3 kHz.

The processor may be further configured to process the second speech signal to determine one or more parameters of the speech; and, enhance the first speech signal based on each of the one or more parameters of the speech that are determined.

Each of the one or more parameters of the speech may be a pitch of the speech, an onset of the speech, or an offset of the speech.

The mobile communication device may further include a body having a top wall and an opposing bottom wall, the primary microphone may be disposed proximate the bottom wall, and the secondary microphone may be disposed proximate the top wall.

The mobile communication device may further include a speaker and the secondary microphone may be disposed adjacent the speaker.

The body of the mobile communication device may include a receiver cavity dimensioned to receive and retain the speaker and the secondary microphone.

Another aspect of the present disclosure provides a method comprising: at a mobile communication device comprising, a primary microphone, a secondary microphone, and a processor, receiving, at the primary microphone, speech and wind noise; generating, at the primary microphone, a first speech signal based on the speech and the wind noise that is received; receiving, at the secondary microphone, attenuated speech, wherein the secondary microphone is shielded from the wind noise when the primary microphone receives the speech and the wind noise; generating, at the secondary microphone, a second speech signal based on the attenuated speech that is received; and, processing, at the processor, the first speech signal to replace a low frequency portion of the first speech signal with a low frequency portion of the second speech signal to mitigate the wind noise in the first speech signal.

Processing, at the processor, the first speech signal to replace a low frequency portion of the first speech signal with the low frequency portion of the second speech signal may further comprise: filtering the low frequency portion of the second speech signal to generate an equalized signal; aligning, in time, the equalized signal with the low frequency portion of the first speech signal to generate a time-aligned equalized signal; and, mixing a high frequency portion of the first speech signal with the time-aligned equalized signal.

Mixing may include mixing the high frequency portion of the first speech signal with the time-aligned equalized signal in a time domain.

Mixing may include mixing the high frequency portion of the first speech signal with the time-aligned equalized signal in a frequency domain.

The method may further comprise: determining, at the processor, a frequency span of the wind noise received at the primary microphone; and, determining, at the processor, a frequency range of the low frequency portion of the first speech signal to be replaced based on the determined frequency span of the wind noise.

The frequency range low of the frequency portion of the first speech signal may be 0 kHz to 3 KHz.

Processing, at the processor, the first speech signal to replace a low frequency portion of the first speech signal with the second speech signal may further comprise: processing the second speech signal to determine one or more parameters of the speech; and, enhancing the first speech signal based on each of the one or more parameters of the speech that are determined.

Each of the one or more parameters of the speech may be a pitch of the speech, an onset of the speech, or an offset of the speech.

Another aspect of the present disclosure provides a computer-readable medium storing a computer program, wherein execution of the computer program is for controlling a mobile communication device comprising, a primary microphone, a secondary microphone, and a processor to: receive, at the primary microphone, speech and wind noise; generate, at the primary microphone, a first speech signal based on the speech and the wind noise that is received; receive, at the secondary microphone, attenuated speech, wherein the secondary microphone is shielded from the wind noise when the primary microphone receives the speech and the wind noise; generate, at the secondary microphone, a second speech signal based on the attenuated speech that is received; and, process, at the processor, the first speech signal to replace a low frequency portion of the first speech signal with a low frequency portion the second speech signal to mitigate the wind noise in the first speech signal.

For simplicity and clarity of illustration, reference numerals may be repeated among the figures to indicate corresponding or analogous elements. Numerous details are set forth to provide an understanding of the implementations described herein. The implementations may be practiced without these details. In other instances, well-known methods, procedures, and components have not been described in detail to avoid obscuring the implementations described. The present disclosure is not to be considered as limited to the scope of the implementations described herein.

Attention is directed to FIG. 1, which depicts a block diagram of a mobile communication device 100, referred to interchangeably hereafter as device 100, according to an example implementation of the disclosure.

Device 100 may be any type of electronic device that can be used in a self-contained manner to communicate with one or more communication networks. Device 100 may include, but is not limited to, any suitable combination of electronic devices, communications devices, computing devices, mobile electronic devices, telephones, PDAs (personal digital assistants), cellphones, smartphones, and the like. Other suitable devices are within the scope of present implementations.

Figure 2:
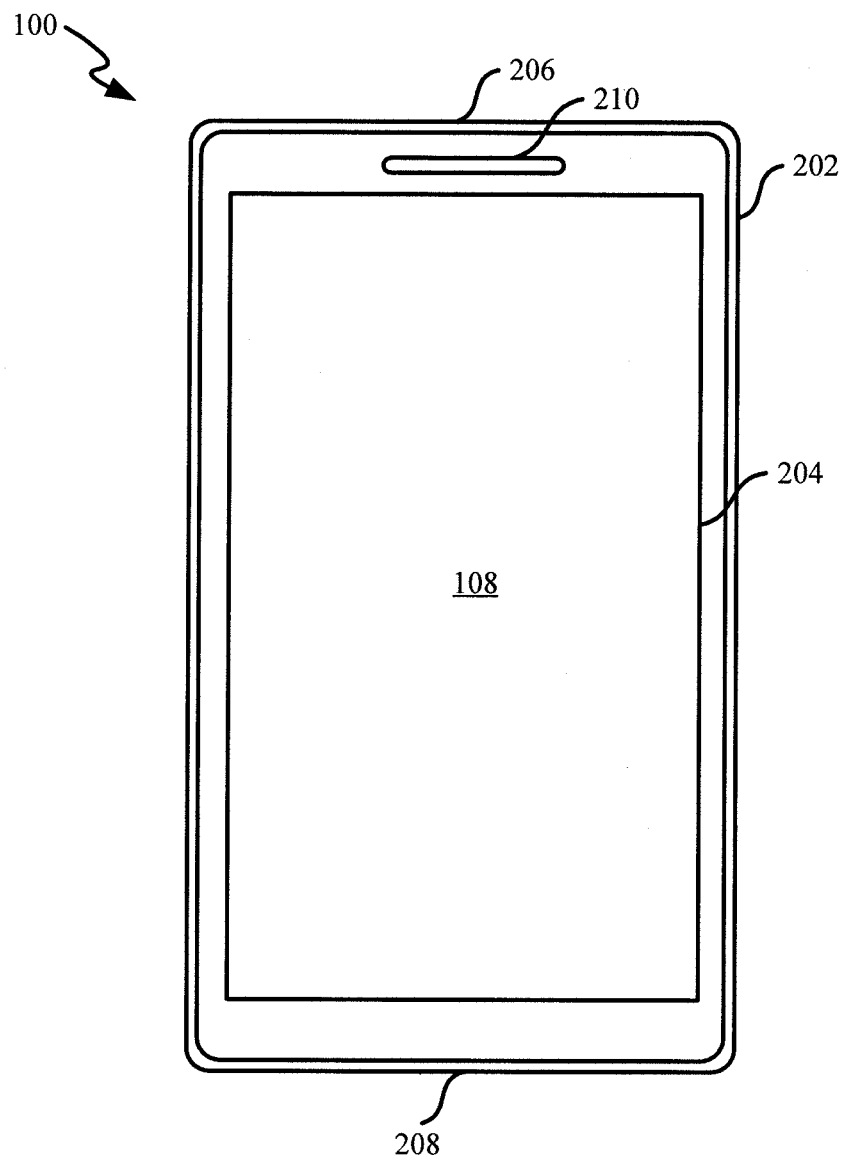
FIG. 2 is a front view of a mobile communication device of FIG. 1 in accordance with the disclosure.

It should be emphasized that the shape and structure of device 100 in FIG. 1 and FIG. 2 are purely examples, and contemplate a device that can be used for both wireless voice (e.g. telephony) and wireless data communications (e.g. email, web browsing, text, and the like).

Device 100 includes multiple components, such as a processor 102 that controls the overall operation of device 100. Processor 102 is coupled to and interacts with other components of device 100, including at least one input device 104, a memory 106, a display 108, a communication interface 110, a speaker 112, a primary microphone 114, a secondary microphone 116, and a power supply 118.

Input device 104 is generally configured to receive input data, and may include any suitable combination of input devices, including but not limited to a keyboard, a keypad, a pointing device, a mouse, a track wheel, a trackball, a touchpad, a touchscreen and the like. Other suitable input devices are within the scope of present implementations.

Input from input device 104 is received at processor 102. Processor 102 may be implemented as a plurality of processors, and/or as one or more DSPs including but not limited to one or more central processors (CPUs)). Processor 102 is configured to communicate with memory 106 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 100 as described herein are typically maintained, persistently, in memory 106 and used by processor 102 which makes appropriate utilization of volatile storage during the execution of such programming instructions. Those skilled in the art will now recognize that memory 106 is an example of computer readable media that can store programming instructions executable on processor 102. Furthermore, memory 106 is also an example of a memory unit and/or memory module.

Device 100 also includes an operating system 120 and software programs or applications 122 that control basic device operations, including data and voice communication applications. Operating system 120 and the software programs or applications 122 are normally installed on the device 100 at manufacture and are typically stored in memory 106. Operating system 120 and the software programs or applications 122 are executed by the processor 102. Those skilled in the art will appreciate that portions of operating system 120 and software programs or applications 122, such as specific device applications, or parts thereof, may be temporarily loaded into volatile storage unit of memory 106. Other software programs can also be included as is well known to those skilled in the art.

Processor 102 is further configured to interact with display 108, which comprises any suitable one of, or combination of, flat panel displays (e.g. LCD (liquid crystal display), plasma displays, OLED (organic light emitting diode) displays, touch-sensitive displays such as capacitive, resistive, infrared, surface acoustic wave (SAW), optical touchscreen displays, CRTs (cathode ray tubes) and the like.

Processor 102 is further configured to interact with communication interface 110 (interchangeably referred to interchangeably as interface 100), which may be implemented as one or more radios and/or connectors and/or network adaptors, configured to wirelessly communicate with one or more communication networks (not depicted). It will be appreciated that interface 100 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

Processor 102 is further configured to interact with speaker 112, primary microphone 114 and secondary microphone 116. Speaker 112 outputs audible information converted from an electrical signal. Primary microphone 114 generates a signal that is representative of the received audible information by converting received audible information, such as speech of a user of device 100 and wind noise into a signal that is representative of the received audible information, as described in further detail below. Similarly, secondary microphone 116 generates another signal that is representative of the received audible information by converting received audible information, such as attenuated speech of a user of device 100 into another signal that is representative of the attenuated speech, as described in further detail below.

Power supply 118 powers components of device 100 including, but not limited to processor 102, input device 104, memory 106, display 108, interface 110, speaker 112, primary microphone 114 and secondary microphone 116. Power supply 118 may include, a battery, a power pack and the like; however, in other implementations, power supply 118 may include a connection to a mains power supply and/or a power adaptor (e.g. and AC-to-DC (alternating current to direct current) adaptor).

Attention is now directed to FIG. 2, which depicts a front view of an example implementation of device 100. Device 100 includes a body 202 that encloses components such as shown in FIG. 1. Body 202 includes a front face 204, a top wall 206, and a bottom wall 208. It will be appreciated that the terms "front face", "top wall", and "bottom wall" are used to describe body 202 when device 100 is orientated for use, as shown in FIG. 2, are not meant to be limiting.

Display 108 is disposed in body 202 and exposed at front face 204 for user-interaction. Speaker 112 is disposed in a receiver cavity 210 formed in body 202. Receiver cavity 210 is disposed in body 202 proximate top wall 206 and exposed at front face 204 of device 100. Primary microphone 114 is disposed in body 202 such that primary microphone 114 receives speech from a user and wind noise from a surrounding environment when device 100 is being used by a user. Secondary microphone 116 is disposed in body 202 such that secondary microphone 116 is protected or shielded from the wind noise when primary microphone 114 is receiving the speech and the wind noise. Secondary microphone 116 receives attenuated speech when primary microphone 114 receives the speech and the wind noise. The attenuated speech is the speech received from a user that is attenuated at high frequencies, such as, for example, frequencies greater than 3 kHz, when secondary microphone 116 is shielded or protected from the wind noise.

In the example implementation shown in FIG. 2, primary microphone 114 is disposed in body 202 proximate bottom wall 208 and secondary microphone 116 is disposed in body 202 proximate top wall 206. Optionally, secondary microphone 116 may be disposed in receiver cavity 210 adjacent speaker 112. Although primary microphone 114 is shown in FIG. 2 proximate bottom wall 208, in alternate non-limiting implementations, primary microphone 114 may be disposed in body 202 at any suitable location such that primary microphone 114 receives both speech and wind noise. Also, although secondary microphone 116 is shown proximate top wall 206, in alternate non-limiting implementations, secondary microphone 116 may be disposed in body 202 at any suitable location such that secondary microphone 116 receives speech that is attenuated at high frequencies when primary microphone 114 receives the speech and the wind.

Figure 3:
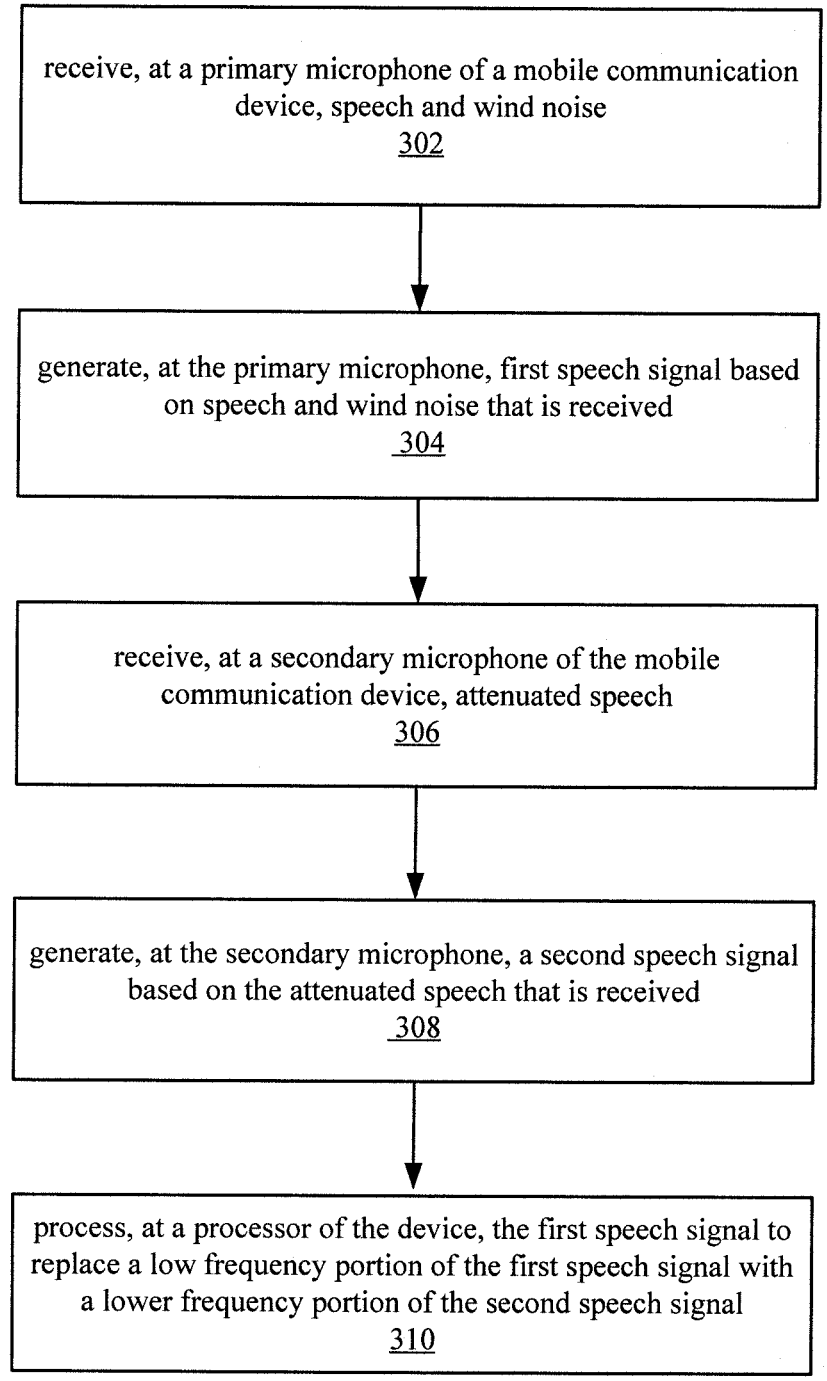
FIG. 3 is a flowchart depicting a method of mitigating wind noise in a speech signal generated at a primary microphone of the mobile communication device of FIG. 1 in accordance with the disclosure.

Attention is now directed to FIG. 3, which depicts a flowchart of a method 300 for controlling a mobile communication device to mitigate wind noise in audible information received at primary microphone 114 of device 100, according to an example implementation. Method 300 may be carried out by software executed, for example, by processor 102 of device 100. Coding of software for carrying out method 300 is within the scope of a person of ordinary skill in the art given the present disclosure. Computer-readable code executable by at least one processor 102 of device 100 to perform method 300 may be stored in a computer-readable storage medium, device, or apparatus, such as a non-transitory computer-readable medium.

It is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps".

At block 302, primary microphone 114 of device 100 receives speech from a user and wind noise from a surrounding environment of device 100.

At block 304, primary microphone 114 generates a first speech signal based on the speech and the wind noise that is received at block 302. The first speech signal includes a low frequency portion and a high frequency portion. Since the wind noise generally has a frequency span of up to 3 kHz, the low frequency portion of the first speech signal may have a frequency range of 0 to 3 kHz and the high frequency portion of the first speech signal may have a frequency range greater than 3 kHz. Alternatively, the low frequency portion of the first speech signal may have a frequency range of 0 to 2 kHz and the high frequency portion of the first speech signal may have a frequency range greater than 2 kHz. Optionally, processor 102 may determine a frequency span of the wind noise received at primary microphone 114 and may determine a frequency range for the low frequency portion of the first speech signal based on frequency span of the wind noise that is determined.

At block 306, secondary microphone 116 of device 100 receives attenuated speech. Secondary microphone 116 is shielded from the wind noise when primary microphone 114 receives the speech and the wind noise at 302 and receives attenuated speech as primary microphone 114 receives the speech and the wind noise at 302. The speech received at secondary microphone 116 may be attenuated at high frequencies, such as frequencies greater than 3 kHz.

At block 308, secondary microphone 116 generates a second speech signal from the attenuated speech received at block 306.

At block 310, processor 102 processes the first speech signal to replace a low frequency portion of the first speech signal with the second speech signal to mitigate the wind noise in the first speech signal. Processor 102 may replace the low frequency portion of the first speech signal with a low frequency portion of the second speech signal by: filtering the low frequency portion of the second speech signal to generate an equalized signal; aligning, in time, the equalized signal with the low frequency portion of the first speech signal to generate a time-aligned equalized signal; and, mixing a high frequency portion of the first speech signal with the time-aligned equalized signal.

Optionally, mixing a high frequency portion of the first speech signal with the time-aligned equalized signal may be performed at processor 102 either the time domain or the frequency domain.

Optionally, processor 102 processes the second speech signal to determine one or more parameters of the speech, such as, for example, a pitch of the speech, an onset of the speech, or an offset of the speech, and enhances the first speech signal based on each of the one or more parameters of the speech that are determined. For example, the pitch, onset and offset parameters may be used to generate a synthetic speech waveform to replace the first speech signal which is corrupted by wind noise. Alternatively, the onset and offset information may be used to attenuate the first speech signal when speech is not present to reduce the perceptual impact of the noise.

Figure 4:
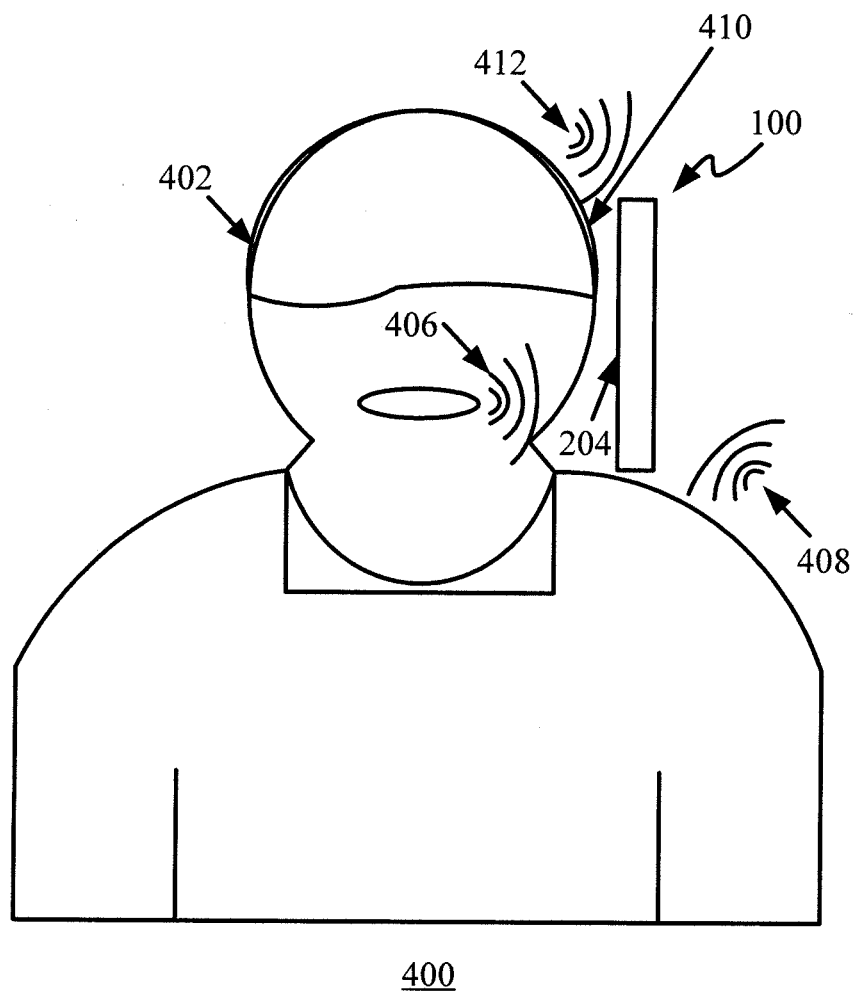
FIG. 4 is a perspective view of the mobile communication device of FIG. 1 when being used by a user in accordance with the disclosure.

Method 300 will now be discussed with reference to FIG. 4, which depicts device 100 being used by a user 400 in accordance with an example implementation. As shown in FIG. 4, when device 100 is being used by user 400, front face 208 of device 100 is adjacent to a head 402 of user 400. Primary microphone 114, which is, in the example implementation shown in FIG. 4, disposed in body 202 proximate bottom wall 208 of device 100 is exposed to receive speech 406 from user 400 and wind noise 408 from the environment in which device 100 is used. Secondary microphone 116, which is, in the example implementation shown in FIG. 4, disposed in body 202 proximate top wall 208 and adjacent speaker 112, is shielded or protected from wind noise 408 by, for example, an ear 410 of user 400.

Primary microphone 114 receives, at block 302, speech 406 from user 400 and wind noise 408 from the surrounding environment and generates, at block 304, a first speech signal based on speech 406 and the wind 408 that is received at block 302. Wind 408 received at primary microphone 114 causes a transducer membrane (not shown) of primary microphone 114 to move and generate wind noise, which corrupts the first speech signal generated by primary microphone 114 at block 302.

Secondary microphone 116, which is shielded or protected from wind noise 408 by ear 410 of user 400, receives, at block 306, attenuated speech 412 and generates, at block 310, a second speech signal based on attenuated speech 412 that is received. Attenuated speech 412 is version of speech 406 received from user that attenuated at high frequencies and preserves low frequency content of speech 406 from user 400 due to the proximity of device 100 to ear 410 of user 400.

Processor 102 processes, at block 310, the first speech signal to replace a low frequency portion of the first speech signal with the second speech signal. Processor 102 processes, at block 310, the first speech signal to replace a low frequency portion of the first speech signal with a low frequency portion of the second speech signal to mitigate wind noise in the first speech signal. Processor 102 replaces the low frequency portion of the first speech signal with a low frequency portion of the second speech signal by: filtering the low frequency portion of the second speech signal to generate an equalized signal; aligning, in time, the equalized signal with the low frequency portion of the first speech signal to generate a time-aligned equalized signal; and, mixing a high frequency portion of the first speech signal with the time-aligned equalized signal.

Figure 5A:
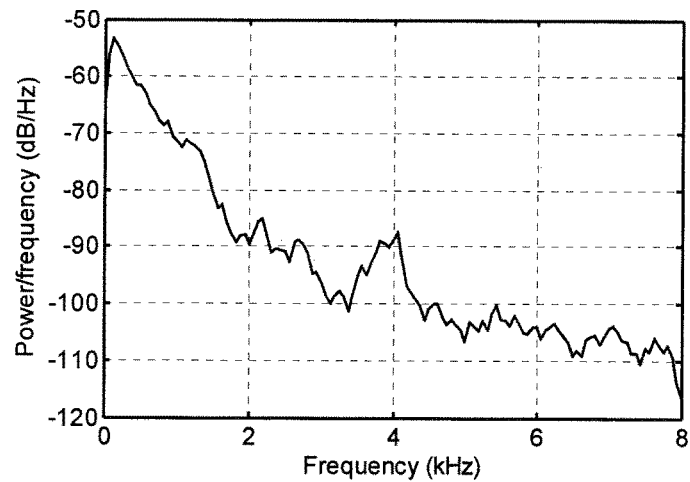
FIG. 5A is a graph that depicts the frequency spectrum of the first speech signal generated at the primary microphone of the mobile communication device of FIG. 1 in accordance with the disclosure.
Figure 5B:
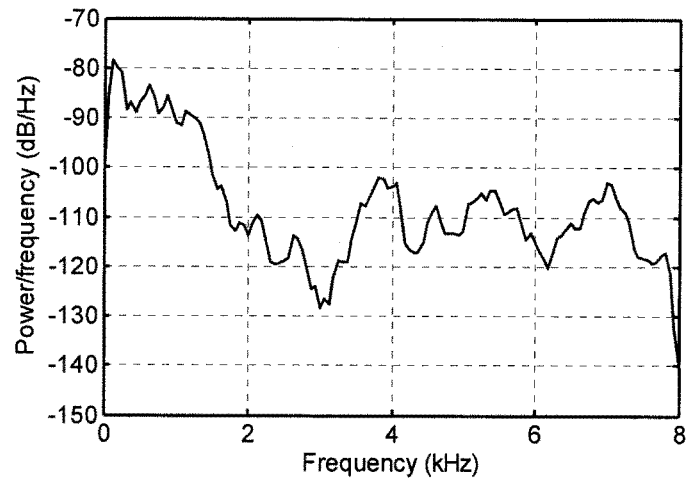
FIG. 5B is a graph that depicts the frequency spectrum of the second speech signal generated at a secondary microphone of the mobile communication device of FIG. 1 in accordance with the disclosure.
Figure 5C:
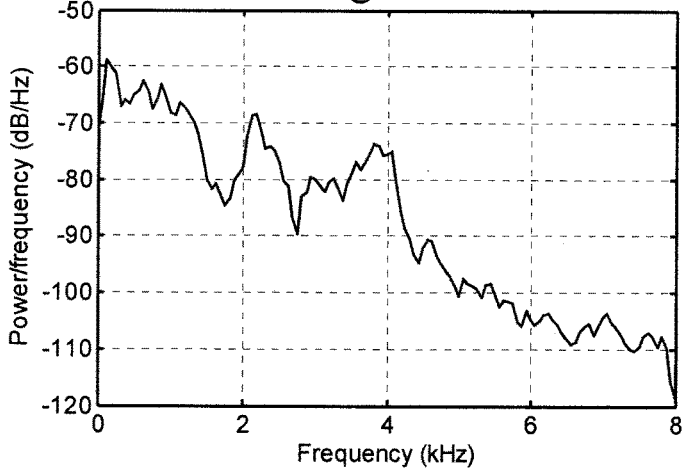
FIG. 5C is a graph that depicts the frequency spectrum of the first speech signal after processing in accordance with the disclosure.

Attention is now directed to FIGS. 5A, 5B, and 5C, in which FIG. 5A depicts the frequency spectrum of the first speech signal generated by primary microphone 114 at block 302 according to an example implementation; FIG. 5B depicts the frequency spectrum of the second speech signal generated by secondary microphone 116 at block 308 according to an example implementation; and FIG. 5C depicts the frequency spectrum of the first speech signal after processing by processor 102 at block 310 according to an example implementation. In the example implementation shown in FIG. 5A, the low frequency portion of the first speech signal is dominated by wind noise, and the wind is limited to the frequency range below 3 kHz. In the example implementation shown in FIG. 5B, the low frequency portion of the second speech signal also has a frequency range of 0 to 3 kHz which is unaffected by wind noise due to shielding from, for example, ear 410 of user 400. In the example implementation depicted in FIG. 5C, the 0 to 3 kHz portion of the first speech signal has been replaced with the 0 to 3 kHz portion of the second speech signal in order to mitigate the wind noise in the first speech signal.

Figure 6A:
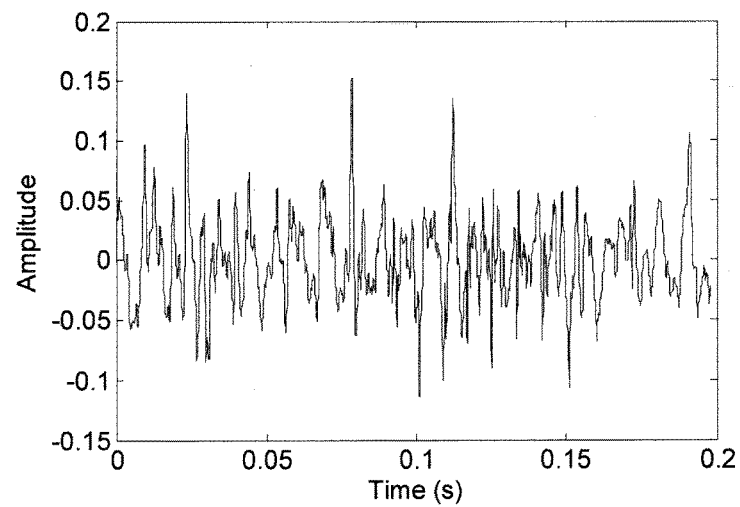
FIG. 6A is a graph that depicts the time domain waveform of the first speech signal generated at the primary microphone of the mobile communication device of FIG. 1 in accordance with the disclosure.
Figure 6B:
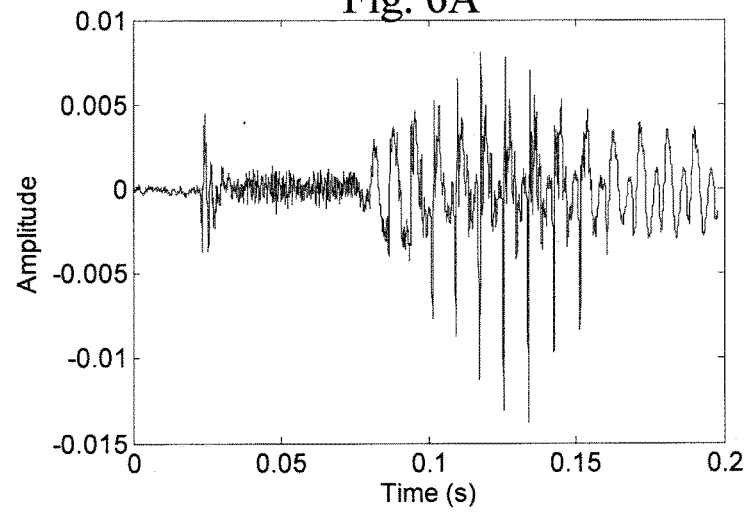
FIG. 6B is a graph that depicts the time domain waveform of the second speech signal generated at a secondary microphone of the mobile communication device of FIG. 1 in the time domain in accordance with the disclosure.
Figure 6C:
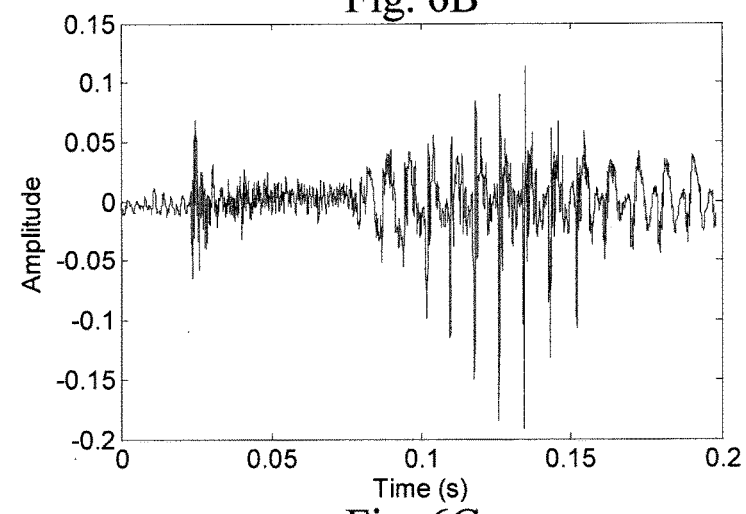
FIG. 6C is a graph that depicts the time domain waveform of the first speech signal after processing in accordance with the disclosure.

Attention is now directed to FIGS. 6A, 6B, and 6C, in which FIG. 6A depicts the time domain waveform of the first speech signal generated by primary microphone 114 at block 302 according to an example implementation, FIG. 6B depicts the time domain waveform of the second speech signal generated by secondary microphone 116 at block 30 according to an example implementation 8, and FIG. 6C depicts the time domain waveform of the first speech signal after processing by processor 102 at block 310 according to an example implementation. In the example implementation depicted in FIG. 6A, the low frequency portion of the first speech signal is dominated by wind noise. In the example implementation depicted in FIG. 6B, the pitched speech in the low frequency portion of the second speech signal is quite visible (i.e., large, periodic oscillations at a slow rate in the second half of the figure) and the second speech signal is unaffected by wind noise due to shielding from, for example, ear 410 of user 400. In the example implementation depicted in FIG. 6C, the low frequency portion of the first speech signal has been replaced with the low frequency portion of the second speech signal in order to mitigate the wind noise in the first speech signal.

The method and device of the present disclosure reduces wind noise in a signal generated at a microphone of the device without removing any desired speech in the speech signal generated by the microphone of the device.

Those skilled in the art will appreciate that in some implementations, the functionality of device 100 can be implemented using pre-programmed hardware or firmware elements (e.g., application specific integrated circuits (ASICs), electrically erasable programmable read-only memories (EEPROMs), etc.), or other related components. In other implementations, the functionality of device 100 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program code can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever Persons skilled in the art will appreciate that there are yet more alternative implementations and modifications possible, and that the above examples are only illustrations of one or more implementations. The scope, therefore, is only to be limited by the claims appended hereto.

What is claimed is:

1. A mobile communication device comprising:
   a primary microphone configured to receive speech from a user and wind noise and generate a first speech signal based on the speech and the wind noise that is received;
   a secondary microphone shielded from the wind noise and configured to receive attenuated speech as the primary microphone receives the speech and the wind noise and generate a second speech signal based on the attenuated speech that is received, wherein the attenuated speech is the speech received from the user that is attenuated at frequencies greater than 3 kHz; and,
   a processor operably coupled to the primary microphone and the secondary microphone, the processor configured to:
   process the first speech signal to replace a low frequency portion of the first speech signal with a low frequency portion of the second speech signal to mitigate the wind noise in the first speech signal.

2. The mobile communication device of claim 1, wherein the processor further configured to replace the low frequency portion of the first speech signal with the low frequency portion of the second speech signal by:
   filtering the low frequency portion of the second speech signal to generate an equalized signal;
   aligning, in time, the equalized signal with the low frequency portion of the first speech signal to generate a time-aligned equalized signal; and,
   mixing a high frequency portion of the first speech signal with the time-aligned equalized signal.

3. The mobile communication device of claim 2, wherein mixing comprises mixing the high frequency portion of the first speech signal with the time-aligned equalized signal in a time domain.

4. The mobile communication device of claim 2, wherein mixing comprises mixing the high frequency portion of the first speech signal with the time-aligned equalized signal in a frequency domain.

5. The mobile communication device of claim 1, wherein the processor is further configured to:
   determine a frequency span of the wind noise received at the primary microphone; and, determine a frequency range of the low frequency portion of the first speech signal to be replaced based on the frequency span of the wind noise that is determined.

6. The mobile communication device of claim 5, wherein the frequency range of the low frequency portion of the first speech signal is 0 kHz to 3 KHz.

7. The mobile communication device of claim 1, wherein the processor is further configured to:
process the second speech signal to determine one or more parameters of the speech; and,
enhance the first speech signal based on each of the one or more parameters of the speech that are determined.

8. The mobile communication device of claim 7, wherein each of the one or more parameters of the speech is a pitch of the speech, an onset of the speech, or an offset of the speech.

9. The mobile communication device of claim 1, further comprising a body having a top wall and an opposing bottom wall, wherein the primary microphone is disposed proximate the bottom wall, and wherein the secondary microphone is disposed proximate the top wall.

10. The mobile communication device of claim 1, further comprising a speaker and wherein the secondary microphone is disposed adjacent the speaker.

11. The mobile communication device of claim 10, further comprising a receiver cavity dimensioned to receive and retain the speaker and the secondary microphone.

12. A method comprising:
at a mobile communication device comprising, a primary microphone, a secondary microphone, and a processor,
receiving, at the primary microphone, speech from a user and wind noise;
generating, at the primary microphone, a first speech signal based on the speech and wind noise that is received;
receiving, at the secondary microphone shielded from the wind noise, attenuated speech as the primary microphone receives the speech and the wind noise, wherein the attenuated speech is the speech received from the user that is attenuated at frequencies greater than 3 kHz;
generating, at the secondary microphone, a second speech signal based on the attenuated speech that is received; and,
processing, at the processor, the first speech signal to replace a low frequency portion of the first speech signal with a low frequency portion of the second speech signal to mitigate the wind noise in the first speech signal.

13. The method of claim 12, wherein processing further comprises:
filtering the low frequency portion of the second speech signal to generate an equalized signal;
aligning, in time, the equalized signal with the low frequency portion of the first speech signal to generate a time-aligned equalized signal; and,
mixing a high frequency portion of the first speech signal with the time-aligned equalized signal.

14. The method of claim 13, wherein mixing comprising mixing the high frequency portion of the first speech signal with the time-aligned equalized signal in a time domain.

15. The method of claim 13, wherein mixing comprising mixing the high frequency portion of the first speech signal with the time-aligned equalized signal in a frequency domain.

16. The method of claim 12, further comprising:
determining, at the processor, a frequency span of the wind noise received at the primary microphone; and,
determining, at the processor, a frequency range of the low frequency portion of the first speech signal to be replaced based on the frequency span of the wind noise that is determined.

17. The method of claim 16, wherein the frequency range of the low frequency portion of the first speech signal is 0 kHz to 3 KHz.

18. The method of claim 12, wherein processing further comprises:
processing the second speech signal to determine one or more parameters of the speech; and,
enhancing the first speech signal based on each of the one or more parameters of the speech that are determined.

19. The method of claim 18, wherein each of the one or more parameters of the speech is a pitch of the speech, an onset of the speech, or an offset of the speech.

20. A computer-readable medium storing a computer program, wherein execution of the computer program is for controlling a mobile communication device comprising, a primary microphone, a secondary microphone, and a processor to:
receive, at the primary microphone, speech from a user and wind noise;
generate, at the primary microphone, a first speech signal based on the speech and wind noise that is received;
receive, at the secondary microphone shielded from the wind noise, attenuated speech as the primary microphone receives the speech and the wind noise, wherein the attenuated speech is the speech received from the user that is attenuated at frequencies greater than 3 kHz;
generate, at the secondary microphone, a second speech signal based on the attenuated speech that is received; and,
process, at the processor, the first speech signal to replace a low frequency portion of the first speech signal with the second speech signal to mitigate the wind noise in the first speech signal.

* * * * *